(12) United States Patent
Mirzaoff et al.

(10) Patent No.: US 6,408,094 B1
(45) Date of Patent: Jun. 18, 2002

(54) DOCUMENT IMAGE ASSESSMENT SYSTEM AND METHOD

(75) Inventors: Alexander David Mirzaoff, Webster; Thaddeus Francis Pawlicki, Akron, both of NY (US)

(73) Assignee: Eastman Kodak Company, Rochester, NY (US)

( * ) Notice: Subject to any disclaimer, the term of this patent is extended or adjusted under 35 U.S.C. 154(b) by 1163 days.

(21) Appl. No.: 08/963,987

(22) Filed: Nov. 4, 1997

Related U.S. Application Data

(63) Continuation of application No. 08/373,817, filed on Jan. 17, 1995, now abandoned.

(51) Int. Cl.[7] .................................................. G06K 9/62
(52) U.S. Cl. ........................ 382/224; 382/177; 382/172
(58) Field of Search ................................. 382/173, 270, 382/271, 282, 296, 289, 177, 224, 172

(56) References Cited

U.S. PATENT DOCUMENTS

| | | | |
|---|---|---|---|
| 4,377,803 A | 3/1983 | Lotspiech et al. | 382/173 |
| 4,545,070 A | 10/1985 | Miyagawa et al. | 382/282 |
| 4,723,297 A | 2/1988 | Postl | 382/296 |
| 5,054,098 A | * 10/1991 | Lee | 382/289 |
| 5,081,690 A | 1/1992 | Tan | 382/270 |
| 5,172,422 A | 12/1992 | Tan | 382/17 |
| 5,179,599 A | 1/1993 | Formanek | 382/271 |
| 5,181,260 A | 1/1993 | Kurosu et al. | 382/296 |
| 5,202,933 A | 4/1993 | Bloomberg | 382/173 |
| 5,235,652 A | 8/1993 | Nally | 382/309 |
| 5,253,307 A | 10/1993 | Wayner et al. | 382/199 |
| 5,270,838 A | 12/1993 | Mita | 358/471 |
| 5,274,716 A | 12/1993 | Mitsuoka et al. | 382/210 |
| 5,278,920 A | 1/1994 | Bernzott et al. | 382/173 |

(List continued on next page.)

FOREIGN PATENT DOCUMENTS

JP    HEI 1-231184    9/1989    ........... G06F/15/70

OTHER PUBLICATIONS

Anonymous, "Real–Time Edge Detection/Rotation of Check Images", *IBM Technical Disclosure Bulletin*, vol. 35, No. 4A, Sep. 1992, pp. 424–428.

Anonymous, "Fast Technique for Finding the Amount Field", *IBM Technical Disclosure Bulletin*, vol. 37, No. 1, Jan. 1994, pp. 167–168.

Andrew W. Davis, "Automated Document Recognition: Environmental Data Entry", *IMC Journal*, vol. 30, No. 1, Jan./Feb. 1994, pp. 14–15.

*Primary Examiner*—Jose L. Couso
*Assistant Examiner*—Anh Hong Do
(74) *Attorney, Agent, or Firm*—Thomas H. Close (57) ABSTRACT

A system and method in accordance with the present invention includes a scanning assembly and a storage device coupled to a programmed computer with a set of instructions for carrying out an assessment of a document image. The system and method operate by: processing the document image to obtain one or more attributes related to the geometrical integrity of the document image; selecting a threshold value from a database for each of the obtained attributes; and then comparing each of the obtained attributes against the threshold value selected for the obtained attribute to determine a difference for each and then evaluating one or more of the differences using predetermined criteria to provide evaluation results of the geometrical integrity of the document image. The system and method may also operate to: process the document image to obtain attributes related to line skew, average character confidence, expected contrast, and sharpness in the document image; select a threshold value from a database for each of the obtained attributes; and compare each of the obtained attributes against the threshold value selected for the obtained attribute to determine the difference for each and then evaluate one or more of the differences using predetermined criteria to provide evaluation results of the condition of the text of the document image and of the condition of the image with respect to a fixed reference.

13 Claims, 9 Drawing Sheets

U.S. PATENT DOCUMENTS

| | | | |
|---|---|---|---|
| 5,297,217 A | 3/1994 | Hamilton, Jr. et al. | 382/276 |
| 5,313,311 A | 5/1994 | Brandkamp | 358/474 |
| 5,321,770 A | 6/1994 | Huttenlocher et al. | 382/199 |
| 5,321,773 A | 6/1994 | Kopec et al. | 382/209 |
| 5,323,472 A | 6/1994 | Falk | 382/210 |
| 5,325,444 A | 6/1994 | Cass et al. | 382/173 |
| 5,325,447 A | 6/1994 | Vogt, III | 382/298 |
| 5,359,667 A | 10/1994 | Borowski et al. | 382/7 |
| 5,557,689 A * | 9/1996 | Huttenlocher et al. | 382/177 |

* cited by examiner

DOCUMENT IMAGE ASSESSMENT SYSTEM AND METHOD

This is a Continuation of application Ser. No. 03/373,817, filed Jan. 17, 1995 now abandoned.

FIELD OF THE INVENTION

This invention relates generally to a document image assessment system and method and more particularly to a system and method for evaluating one or more attributes of a document image to provide an indication of the condition of the document image.

BACKGROUND OF THE INVENTION

High speed imaging devices have been developed to help automate the processing of large volumes of documents. One such device is used by the Internal Revenue Service to process tax return papers. Typically, these devices include a scanner, a document feeder, and a document transport mechanism which has a known uniform background. Documents are loaded into the document feeder which feeds each document on to the document transport mechanism. The scanner captures a document image of each document against the background of the document transport mechanism in a frame of information. The frame of information is then stored for further processing.

Although high speed imaging devices increase the number of documents which can be processed, these devices have limitations. In particular, high speed imaging devices can not provide an indication of the condition of the document image captured in the frame of information. If an indication of the condition of the document image was provided then a determination on whether the document image is suitable for further processing could be made. Examples of some conditions which might be monitored included checks for tears in the document, for corners which were folded over when the document was scanned, multiple documents which were accidentally scanned together covering at least a portion of one of the documents, sheet and line skew, and average character confidence over the entire document. Human operators could be used to evaluate the condition of each document image, but this would substantially reduce the throughput of the high speed imaging devices, thus defeating their usefulness.

PROBLEM(S) TO BE SOLVED BY THE INVENTION

A need has therefore been felt for a system and method for automatically evaluating the condition of one or more document images. Additionally, a need has been felt for a system and method which can automatically evaluate the geometrical integrity of a document image, the condition of the text in a document image, and the condition of the text with respect to a predetermined frame of reference. Further, a need has been felt for a system and method which can assess document images utilizing the information obtained from the original scan of the documents.

SUMMARY OF INVENTION

A system and method in accordance with the present invention includes a scanning assembly and a storage device coupled to a programmed computer. The programmed computer has a set of instructions for carrying out the assessment of document images. The system and method operate by: processing the document image to obtain one or more attributes related to the geometrical integrity of the document image; selecting a threshold value from a database for each of the obtained attributes; and then comparing each of the obtained attributes against the threshold value selected for the obtained attribute to determine a difference for each and then evaluating one or more of the differences using predetermined criteria to provide evaluation results of the geometrical integrity of the document image. The system and method may also operate to: process the document image to obtain attributes related to line skew, average character confidence, expected contrast, and sharpness in the document image; select a threshold value from a database for each of the obtained attributes; and compare each of the obtained attributes against the threshold value selected for the obtained attribute to determine the difference for each and then evaluate one or more of the differences using predetermined criteria to provide evaluation results of the condition of the text of the document image and of the condition of the image with respect to a fixed reference.

With the document image assessment system and method, document images which are not suitable for further processing can be identified. For example, if a document which was scanned into a frame of information was torn or had one or more corners folded over, document image assessment system and method would be able to provide evaluation results which would identify these problems and provide information on the extent of the problems or could simply provide an error signal. The system and method are dynamic, allowing an operator to adjust what attributes from each document image are obtained, what threshold values are used, and what criteria is used for each assessment. With the system and method, the throughput of the high speed imaging devices can be maintained because evaluations of each document image by a human operator are unnecessary. Additionally, the system and method do not necessitate any additional information beyond that obtained from the original scan of the document.

DETAILED DESCRIPTION

Figure 1A:
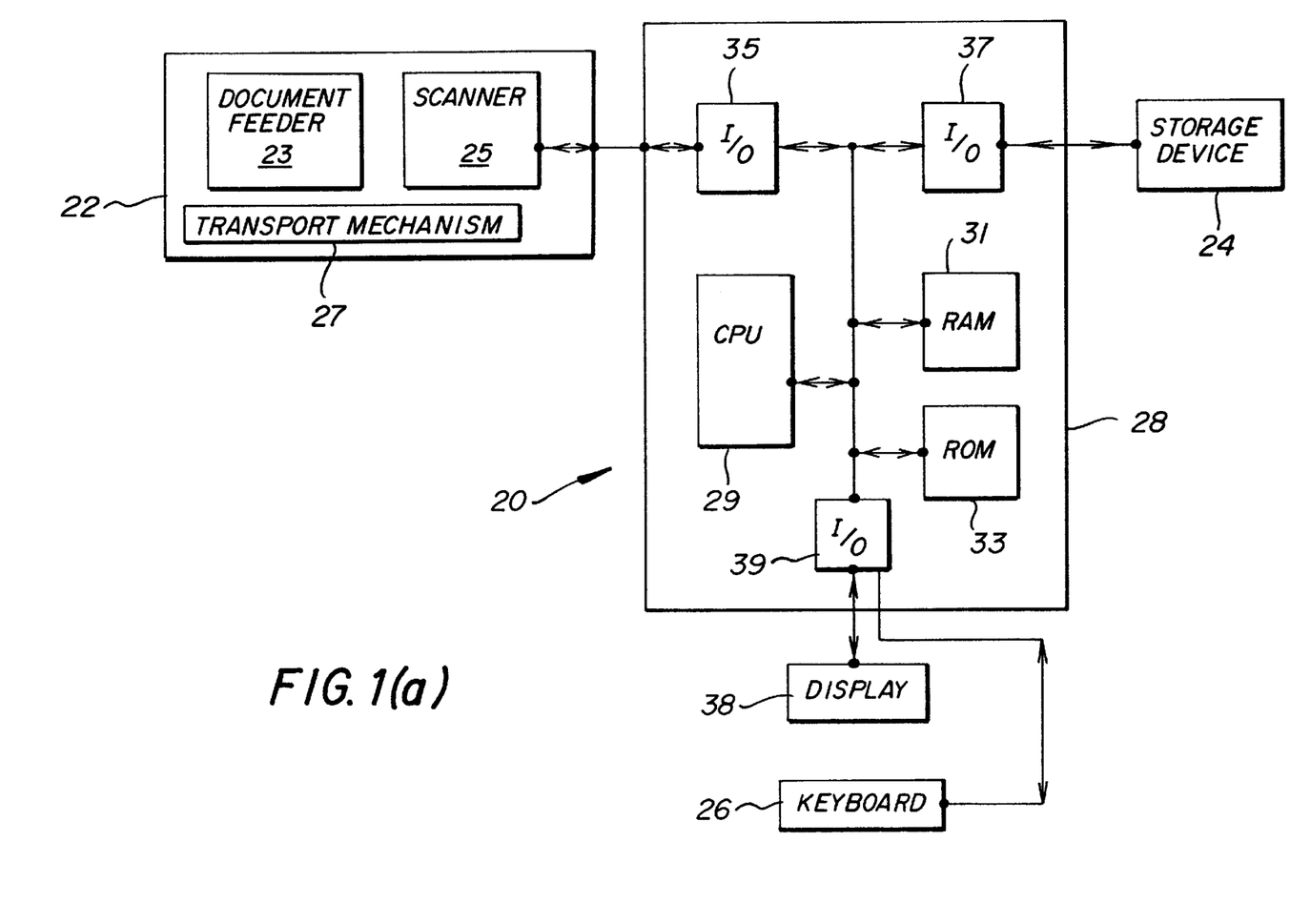
FIG. 1(a) is a block diagram of a document image assessment system in accordance with the present invention.
Figure 1B:
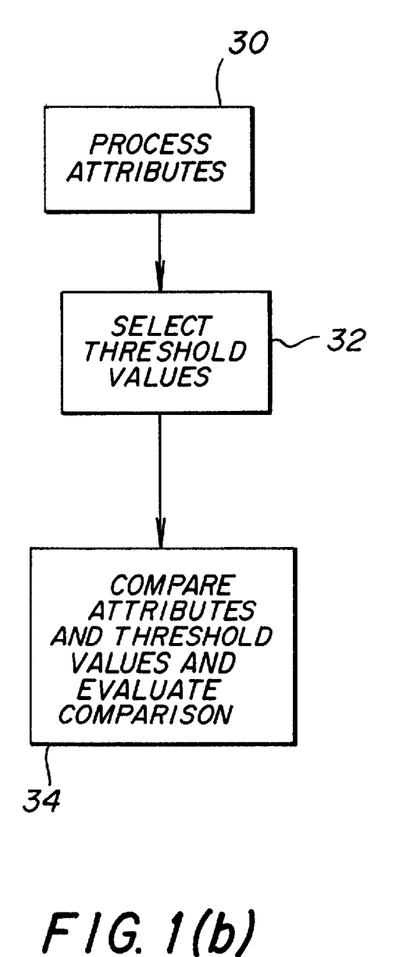
FIG. 1(b) is a flow chart illustrating the method used by the system illustrated in FIG. 1(a)

A document image assessment system 20 and method in accordance with one embodiment of the present invention are illustrated in FIGS. 1(a) and 1(b) respectively. System 20 includes a scanner assembly or high speed imaging device 22 and a storage device 24 which are all coupled to a programmed computer 28. System 20 and method operates by processing a document image to obtain one or more attributes related to the document image (Step 30), selecting a threshold value from a database for each of the obtained attributes (Step 32), and then comparing each of the obtained attributes against the threshold value selected for the obtained attribute to determine a difference between them for each and then using predetermined criteria to evaluate one or more of the differences to provide evaluation results of the geometrical integrity of document image. System 20 and method can also be adapted to process a document image to obtain attributes related to the condition of text in the document image and/or the condition of the document image with respect to a frame of reference. With system 20 and method, the throughput of scanner assembly 22 can be maintained while still obtaining evaluation results of the condition of each document image.

Referring more specifically to FIG. 1(a), system 20 includes scanner assembly 22 which has a document feeder 23, a scanner 25, and a document transport mechanism 27. Documents are loaded into document feeder 23 which places each document on document transport mechanism 27 which has a known uniform background. Scanner 25 scans each document against the background of document transport mechanism 27 and captures a document image of the document in a frame of information which is larger than the size of the document. Each frame of information generated by scanner 25 is represented by a number of rows and columns of pixel data. Each pixel in the pixel data has a grey scale value between 0 and 255 represented in analog form. The background of document transport mechanism 27 will have a pixel value which will be known by programmed computer 28. As a result, the computer 28 will be able to use the known pixel value of the background to distinguish the background from the document image in the frame of information. Once the scanner 25 has obtained the analog pixel data, then scanner 25 will convert the analog pixel data to digital pixel data with an analog-to-digital ("A/D") converter (not shown) and then will output the digital pixel data in serial or parallel form to computer 28. A scanner assembly 22, such as the Imagelink 9XXX Series manufactured by Eastman Kodak Company, could be used.

System 20 also includes storage device 24. Storage device 24 is a memory device, such as a 68000 ADL, which stores the digital pixel data which represent the frames of information, the attributes for each document image, and the evaluation results of document images. Although not shown, storage device 24 could be incorporated within programmed computer 28.

Programmed computer 28 includes a central processing unit ("CPU") 29, a random access memory ("RAM") 31, a read only memory ("ROM") 33, input/output devices ("I/O") 35, 37, and 39, a display 38, and a keyboard 26 which are all coupled to a bus 41. I/O is coupled to scanner 25 and receives the frames of information from scanner 25, I/O 37 is coupled to storage device 24 and outputs and can retrieve frames of information, attributes, and evaluation results, and I/O 39 is coupled to display 38 and keyboard 26 which can receive and output information on the assessment, threshold values, and criteria to evaluate differences. The set of instructions carried out by programmed computer 28 and stored in either RAM 31 or ROM 33 are described below generally with respect to FIG. 1(b) and in greater detail below with respect to FIGS. 2–10.

Although not shown, the set of instructions carried out by programmed computer 28 could also be implemented in computer 28 with application specific integrated circuits ("ASICs").

Referring to FIG. 1(b), a flow chart illustrating the basic operation of the document image assessment system 20 and method is illustrated. Computer 28 receives frames of information in the form of digital pixel data in serial form from scanner 25 or from other sources, such as memory storage devices which have stored frames of information, and processes each frame of information to obtain one or more attributes about the document image in each frame of information (Step 30). The attributes are signals which provide information on the geometrical integrity of the image, the condition of the text within the document image, and the condition of the document image with respect to a frame of reference. An illustrative and non-exhaustive list of attributes and the processes by which each can be obtained are described in detail with respect to FIGS. 2–10. The particular attributes obtained in Step 30 can be selected as desired by the operator of the system. As a result, the operator can tailor the system 20 and method to the particular type of documents the operator would like assessed.

Once the attributes for each document image are obtained, a threshold value for each obtained attribute is selected from a database in RAM 31 or ROM 33 (Step 32). In this particular embodiment, the threshold values are signals which represent the minimum acceptable values for the attributes. The threshold values for the attributes can be changed by the operator through keyboard 26 so that the system 20 can be tailored to the particular type of documents which have been scanned and are being assessed. For example, the operator may adjust threshold values for documents which have a predominantly black background to a lower value then for documents with a predominantly white background.

After the threshold values have been selected (Step 32), each obtained attribute is compared against the threshold value selected for the obtained attribute and the difference between each attribute and threshold value is obtained. One or more of the differences are evaluated using predetermined criteria to provide evaluation results on the geometrical integrity of the document image, the condition of the text of the document image, and/or the condition of the document image with respect to a fixed reference which are stored in storage device 24 (Step 34). Evaluation results are signals which may simply indicate that there is an error with the document image or may identify the type of error and/or provide more detailed information about the error. For example, if a document which was scanned into a frame of information was torn or had one or more corners folded over, document image assessment system 20 and method would be able to provide evaluation results which would identify these problems and provide information on the extent of the problems or could simply provide an error signal. In this particular embodiment, the evaluation results are merely error signals. One example of predetermined criteria which can be used to provide the evaluations results is a set of criteria which evaluates whether the difference between the attribute and threshold value falls within an acceptable range above the threshold value. Another example, is a set of criteria which determines if the difference falls within an acceptable range above or below threshold value. The criteria used is established by the operator and can be adjusted as needed and desired for the particular application. Attributes and the associated threshold values can be evaluated individually or in various combinations, such as in a state event matrix or a decision table. The operator can adjust the criteria used to the particular type of documents which are being scanned and can make adjustments as the comparisons and evaluations are going on. The comparison of attributes against threshold values to obtain the differences between them and the evaluation of the differences is explained in greater detail with respect to FIGS. 2–10. Although in FIGS. 2–10 the attributes and the associated threshold values are compared and evaluated individually, as discussed above system 20 and method can also be designed to evaluate multiple combinations of attributes and the associated threshold values within predetermined criteria.

Figure 2A:
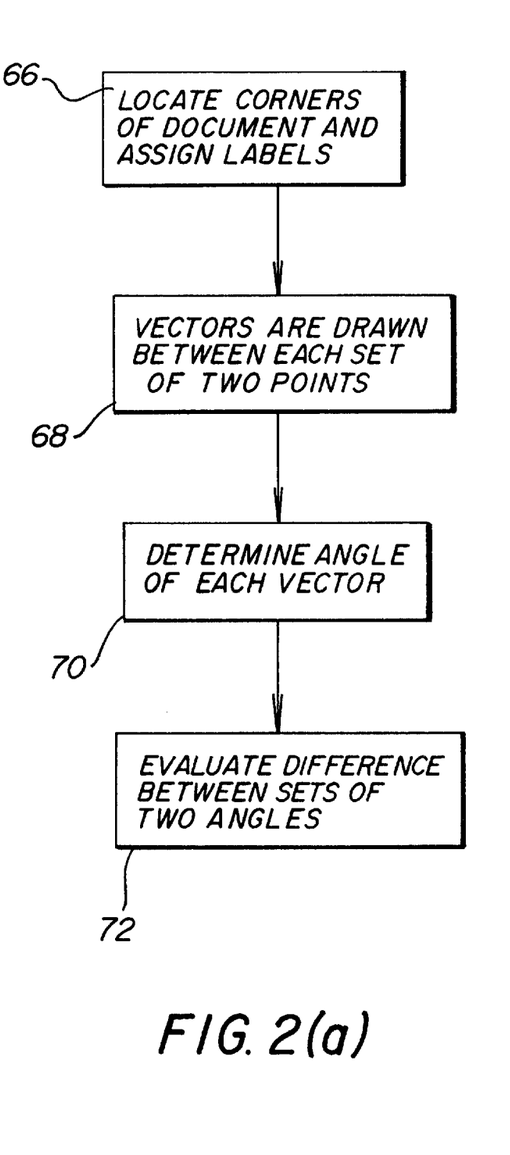
FIG. 2(a) is a flow chart illustrating the process for obtaining, comparing, and evaluating the attribute of rectangularity.
Figure 2B:
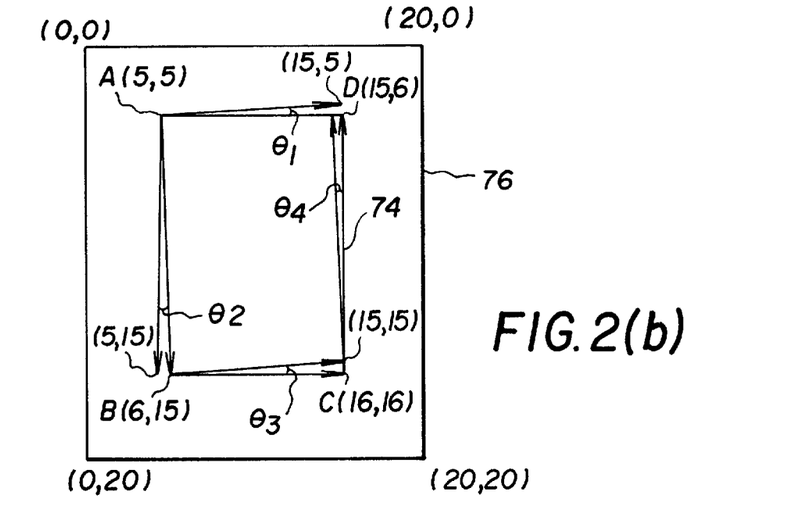
FIG. 2(b) is a perspective view of a frame of information with a document image.

Referring to FIG. 2(*a*), a flow chart illustrates the process for obtaining, comparing, and evaluating the attribute of rectangularity. First, when examining the attributes of rectangularity, the corners of the document image 74 in the frame of information 76 are located and assigned labels A, B, C and D (Step 66) as shown in FIG. 2(*b*). Next, a line is drawn between points A and D to form line AD, between points A and B to form line AB, between points B and C to form line BC, and between points C and D to form line CD (Step 68). Once the lines AD, AB, BC, and CD are drawn then an angle $\theta_1$, for line AD, an angle $\theta_2$ for line AB, an angle $\theta_3$ for line BC, and an angle $\theta_4$ for line CD with respect to a coordinate system based on the frame of information 76 are obtained (Step 70). In this particular embodiment, the upper left-hand corner of frame of information 76 will be assigned coordinates (0, 0) and then the coordinates for points A, B, C, and D (5,5), (15,6), (6,15), and (16,16) are determined. Next, the expected location for corners B, C, and D (5,15), (15,15), and (15,5) are determined. Once the expected corners are identified then by calculating the rise over run between points A and D and point A and the expected location for point D, for points A arid B and point A and the expected location for point B, for points B and C and point B and the expected location for point C, and for points C and D and point C and the expected location for point D angles $\theta_1$, $\theta_2$, $\theta_3$, and $\theta_4$ can be determined. Once angles $\theta_1$, $\theta_2$, $\theta_3$, and $\theta_4$ are obtained, the difference between various combinations of angles are calculated to provide attributes of (Step 72). In this particular embodiment, $\theta_1$ minus $\theta_3$, $\theta_2$ minus $\theta_4$, $\theta_2$ minus $\theta_1$, $\theta_2$ minus $\theta_3$, $\theta_1$ minus $\theta_4$, and $\theta_4$ minus $\theta_3$ are the attributes of rectangularity.

Once the attributes of rectangularity are obtained (Step 30), then the threshold value set for each attribute by the operator are selected (Step 32). Once the threshold value is selected, the difference between each attribute of rectangularity and the threshold value is determined (Step 34). In this particular embodiment, the threshold value for the difference between angles for opposing edges of document image 74 should be zero and the difference in orientation between angles for adjacent edges of document image 74 should be 90°. Specifically, the threshold values for $\theta_1$ minus $\theta_3$ and $\theta_2$ minus $\theta_4$ should be zero and the threshold values for $\theta_2$ minus $\theta_1$, $\theta_2$ minus $\theta_3$, $\theta_1$ minus $\theta_4$, and $\theta_4$ minus $\theta_3$ should be 90°. The differences between the attributes of rectangularity and threshold values are then evaluated using predetermined criteria (Step 34). In this particular embodiment, the predetermined criteria is set to accept a difference of up to 2° between the attributes of rectangularity and the threshold values. If the difference is less than 2°, then the evaluation results signal that the attribute of rectangularity is acceptable. For example, if $\theta_1$, minus $\theta_3$ was 1° then the evaluation results would signal that the attribute of rectangularity is acceptable, but if $\theta_1$, minus $\theta_3$ was 3° then the evaluation results would signal that the attribute of rectangularity is unacceptable. As discussed earlier, the particular criteria used can vary as needed and desired. Examples of criteria used in this and other examples set forth in FIGS. 3–10 for each attribute are intended to be illustrative and not exhaustive.

Figure 3A:
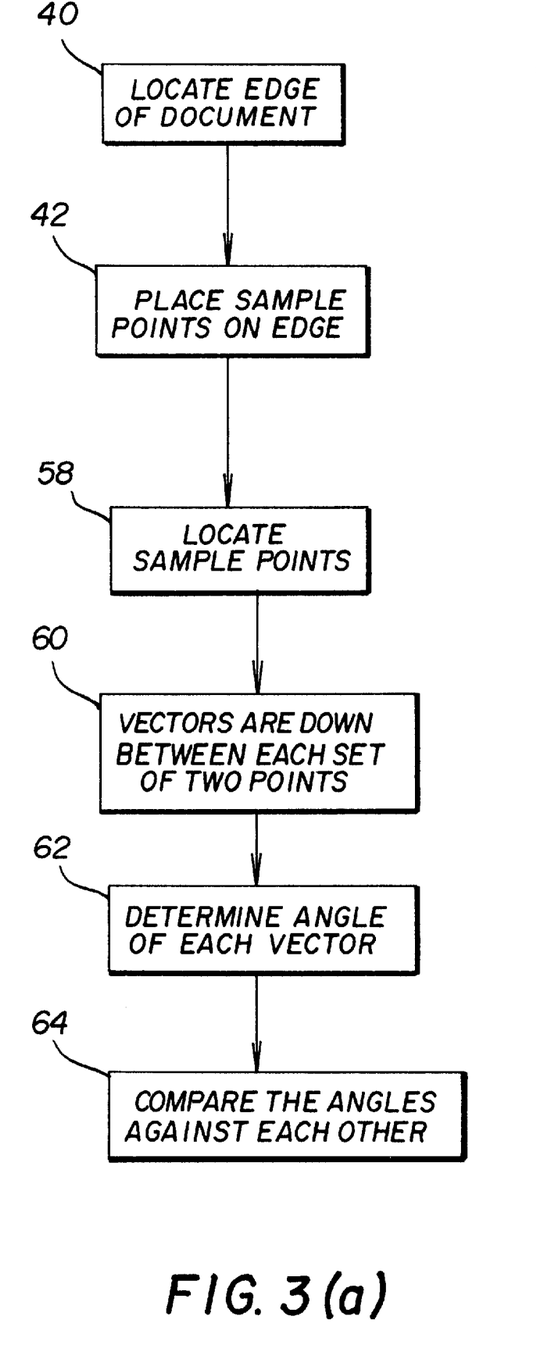
FIG. 3(a) is a flow chart illustrating the process for obtaining, comparing, and evaluating the attribute of linearity.
Figure 3B:
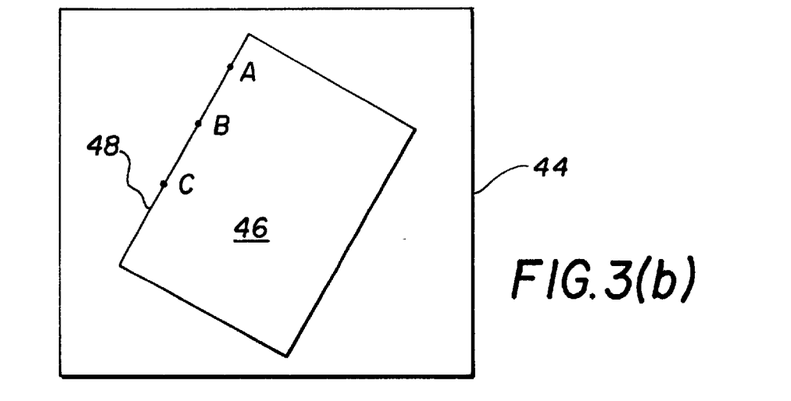
FIG. 3(b) is perspective view of a frame of information with a document image.
Figure 3C:
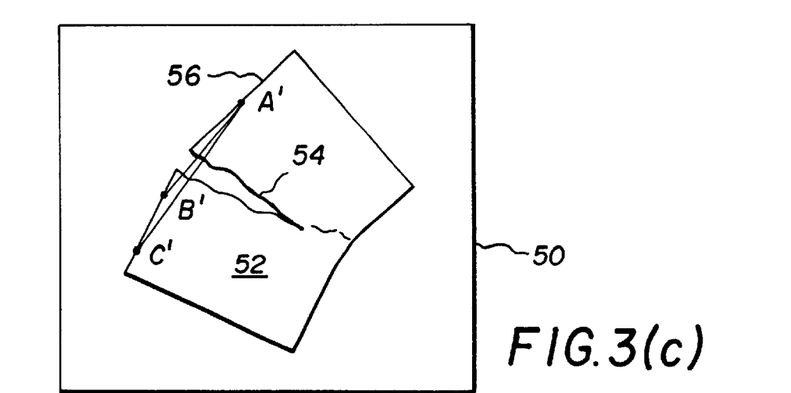
FIG. 3(c) is a perspective view of another frame of information with another document image.

Referring to FIG. 3(a), a flow chart illustrates the process for obtaining, comparing, and evaluating the attribute of linearity. First, when examining the attribute of linearity, at least one edge of the document image is located in the frame of information (Step 40). Techniques for locating one edge of a document image in a frame of information are well known and thus will not be described here. Next, three sample points are placed along the located edge (Step 42). In FIG. 3(*b*), a frame of information 44 with a document image 46 against a fixed background is illustrated. Document image 46 has three sample points located along one edge 48 which are assigned labels A, B, and C. In FIG. 3(*c*), a second frame of information 50 with a document image 52 with a tear 54 is illustrated. Document image 52 has three sample points located along one edge which are assigned labels A', B' and C'. Although sample points A, B, and C and A', B' and C' are only located along one edge 48 and 56 in this example, the sample points could be located and the process performed along each edge of document images 46 and 52. Additionally, more than three sample points could be used if desired. Next, the sample points on each document image 46 and 52 are located (Step 58) and lines are drawn between each combination of two points (Step 60). Accordingly, in FIG. 3(*b*) a line is drawn between points A and B to form line AB, between points A and C to form line AC, and between B and C to form line BC. In FIG. 3(*c*) a line is drawn between points A' and B' to form line A'B', between points A' and C' to form line A'C', and between points B' and C' to form line B'C' . Next, the angles of each line AB, AC, BC, AB, AC', and BC' with respect to a coordinate system based on the frames of information 44 and 50 are determined (Step 62) and then the angles for each line in each frame of information 44 and 50 are compared to determine if they are equal (Step 64). The process used for determining the angles for each line is the same as that discussed earlier with respect to FIG. 2(b) and thus is not repeated again here. In FIG. 3(b), the angles for each of line AB, AC, and BC are equal, while in FIG. 3(c), the angles for each line A' B', A' C', and B' C' are not all equal because of the tear 54. The difference between the angles for each set of two lines in each frame of information 44 and 50 is averaged and this average value is the attribute of linearity for the document images 46 and 52.

Once the attribute of linearity is obtained (Step 30), a threshold value for the attribute is selected from a database in RAM 31 or ROM 33 (Step 32). Once the threshold value is selected, the difference between the attribute of linearity for each frame of information 44 and 50 and the threshold value is determined and then a predetermined set of criteria is used to evaluate each difference and to provide evaluation results (Step 34). In this particular embodiment, the threshold value is 0° and the predetermined criteria is set to allow up to 2° difference between the attribute of linearity and the threshold value. If the difference is less than 2°, then the evaluation results signal that the attribute of linearity is acceptable.

Figure 4A:
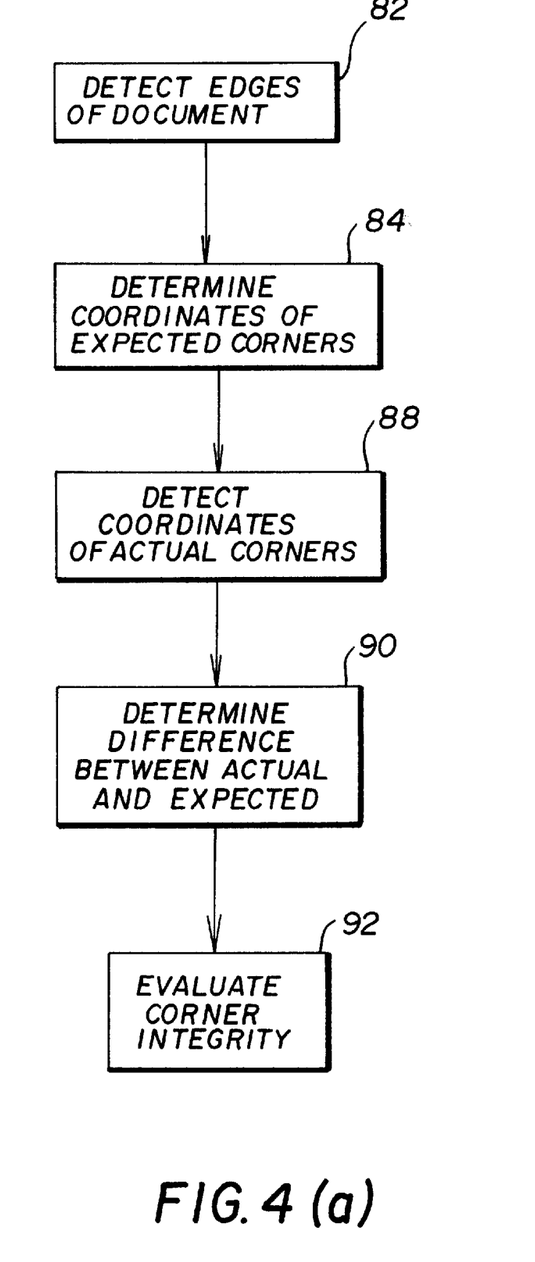
FIG. 4(a) is a flow chart illustrating the process for obtaining, comparing, and evaluating the attribute of corner location.
Figure 4B:
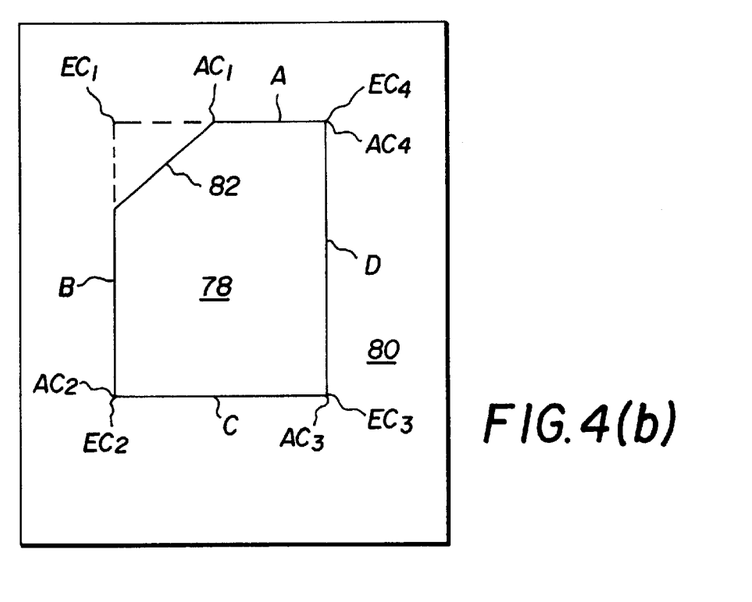
FIG. 4(b) is a perspective view of a frame of information with a document image.

Referring to FIG. 4(a), a flow chart illustrates the process for obtaining, comparing, and evaluating the attribute of corner location. First, when examining the attribute of corner location, the edges A, B, C, and D of a document image 78 in a frame of information 80 are detected (Step 82), as shown in FIG. 4(b). Once each edge A, B, C, and D of document image 78 is identified, the coordinates for the expected corners $EC_1$, $EC_2$, $EC_3$, and $EC_4$ for document image 78 are calculated (Step 84). The document which document image 78 in FIG. 4(b) represents has an upper left-hand corner 86 which was bent when scanned by scanner assembly 22. The dotted lines illustrate where the corner is expected to be. Next, the coordinates for actual corners $AC_1$, $AC_2$, $AC_3$, and $AC_4$ for document image 78 are detected by looking for the first light to dark transition and then dark to light transition in each row of pixels in document image 78 (Step 88). Finally, the distance between the coordinates for actual and expected corners is determined and the distance is the attribute of corner location for each corner of document image 78 (Step 90).

Once the attribute of corner location is obtained (Step 30), a threshold value for the attribute is selected from a database in RAM 31 or ROM 33 (Step 32). In this particular embodiment, the threshold value for the distance is 0 pixels. Once the threshold value is selected, then the difference between the attribute of corner location and the threshold value is determined and then the difference is evaluated using a predetermined criteria to provide evaluation results (Step 34). In this particular embodiment, the predetermined criteria will allow a difference (which is the distance between the expected corner and actual corner) to be up to 50 pixels away. If the difference is not more than 50 pixels, then the evaluation results signal that the attribute of corner location is acceptable.

Figure 5:
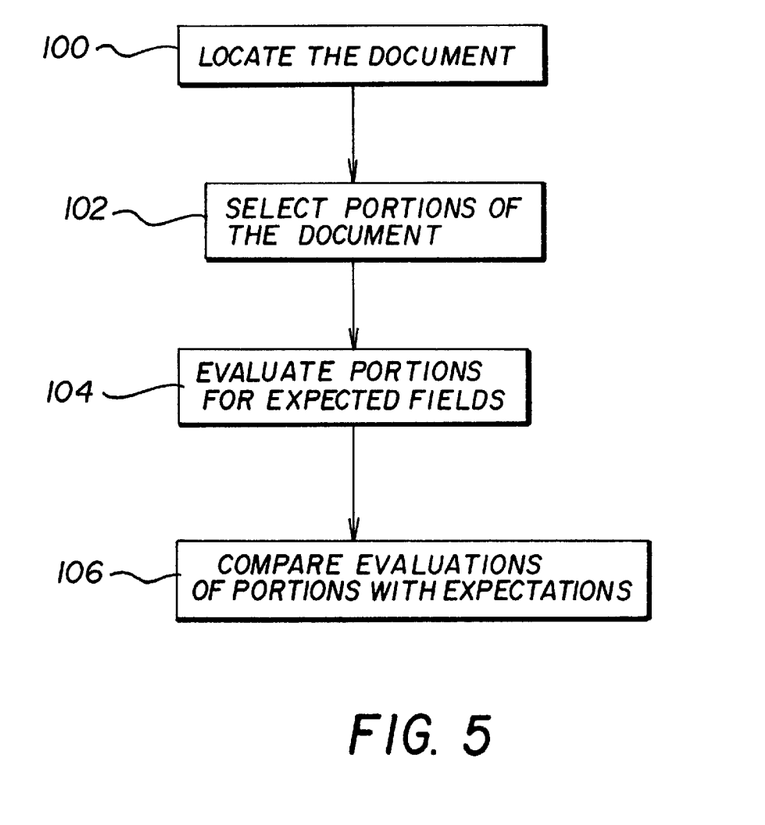
FIG. 5 is a flow chart illustrating the process for obtaining, comparing, and evaluating the attribute of expected fields.

Referring to FIG. 5, a flow chart illustrates the process for obtaining, comparing, and evaluating the attribute of expected fields. First, the document image is located in the frame of information (Step 100). Next, portions of the document image are selected (Step 102) and each portion is evaluated for the presence of an expected field, such as a name and address field or a social security field, in the portion selected (Step 104). The number of expected fields which are identified in their respective portions of the document image is the attribute of expected fields.

Once the attribute of expected fields is obtained (Step 30), a threshold value for the attribute is selected from a database in RAM 31 or ROM 33 (Step 32). In this particular embodiment, the threshold value is a 100% identification rate for locating expected fields. Once the threshold value is selected, the difference between the attribute of expected fields and the threshold value is determined and the difference is evaluated using a predetermined criteria to provide evaluation results (Step 34). In this particular embodiment, the predetermined criteria will allow up to a 10% error rate in locating expected fields. Accordingly, if the difference between the attribute of expected fields and the threshold value does not exceed 10%, then the evaluation results signal that the attribute of expected fields is acceptable.

Figure 6A:
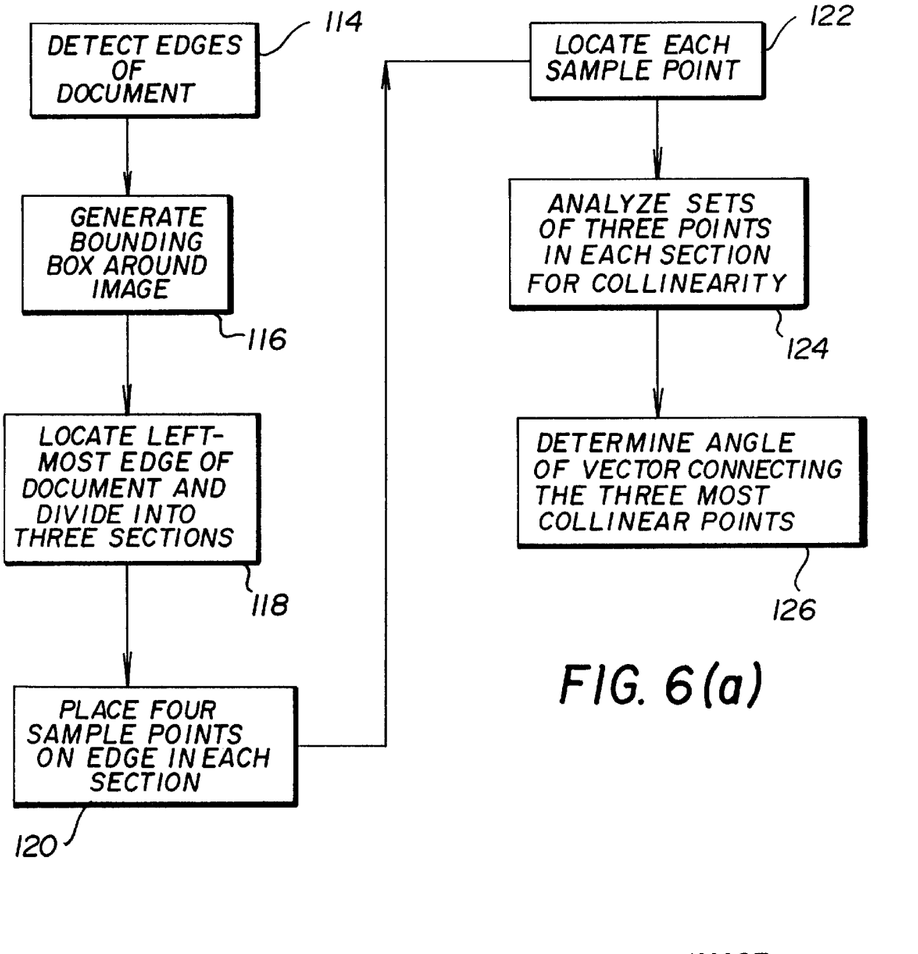
FIG. 6(a) is a flow chart illustrating the process for obtaining, comparing, and evaluating the attribute of sheet skew detection.

Referring to FIG. 6(a), in flow chart illustrates the process for obtaining, comparing, and evaluating the attribute of sheet skew. When scanner assembly 22 is used, like other high speed imaging devices, assembly 22 often induces a rotation in the documents as they move along paper transport mechanism 27 resulting in skewed documents. Subsequent processes, such as form recognition and field segmentation, can not be carried out if the document images are not properly aligned.

Figure 6B:
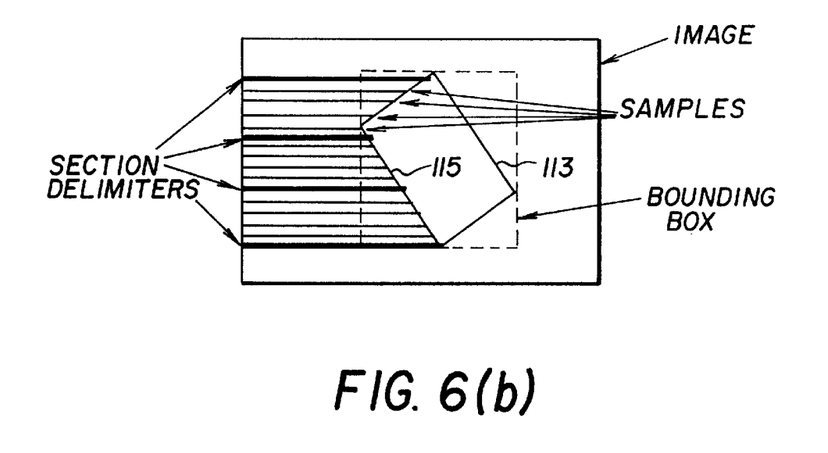
FIG. 6(b) is a perspective view of a frame of information with a document image.

Referring to FIG. 6(b), first the edges of a document image 113 are detected (Step 114) and then a bounding box operation is performed on the document image 113 (Step 116). The left-most edge 115 of the document image 113 is then located and divided into three sections (Step 118). Four samples points are taken from each section corresponding to equally spaced rows within the section (Step 120). Next, the x,y coordinate locations of each sample point on the left-most edge with respect to a fixed reference are found (Step 122). Sets of three points are then analyzed and the three most collinear points within each section are used to describe a line (Step 124). The angle of the vector with respect to the frame of reference is taken as the attribute of sheet skew.

Once the attribute of sheet skew is obtained (Step 30), a threshold value for the attribute is selected from a database in RAM 31 or ROM 33 (Step 32). In this particular embodiment, the threshold value is a sheet skew of 0 degrees. Once the threshold value is selected, the difference between the attribute of sheet skew and the threshold value is determined and then evaluated using a predetermined criteria to provide evaluation results (Step 34 and 126). In this particular embodiment, the predetermined criteria will allow a difference between the attribute of sheet skew and the threshold value of up to ½ a degree. If the difference between the threshold value and the attribute of sheet skew is less than half a degree, then the evaluation results signal that the sheet skew is acceptable. If desired, system 20 can be programmed to correct any sheet skew the document image may have in the frame of information.

Figure 7A:
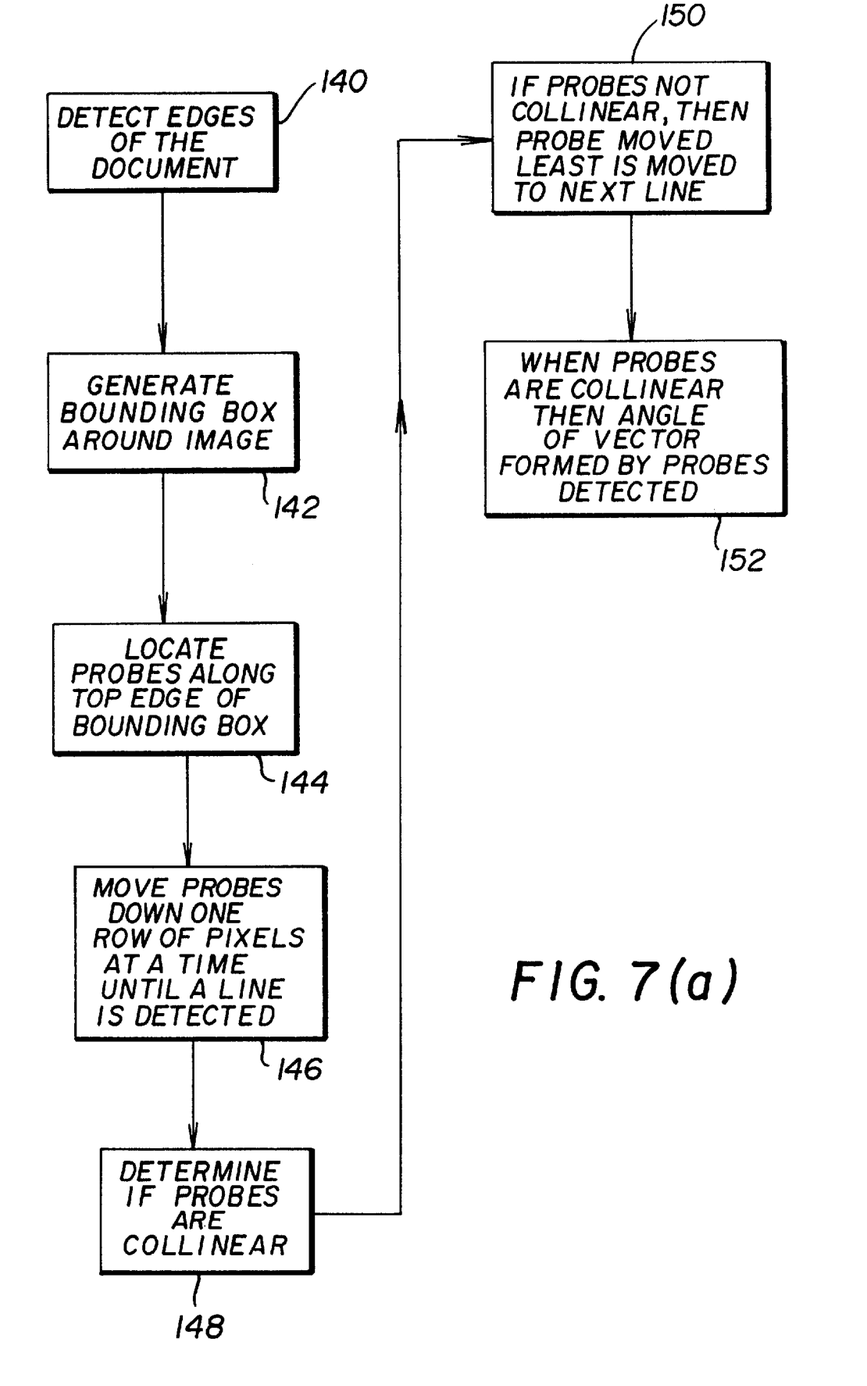
FIG. 7(a) is a flow chart illustrating the process for obtaining, comparing, and evaluating the attribute of line skew.
Figure 7B:
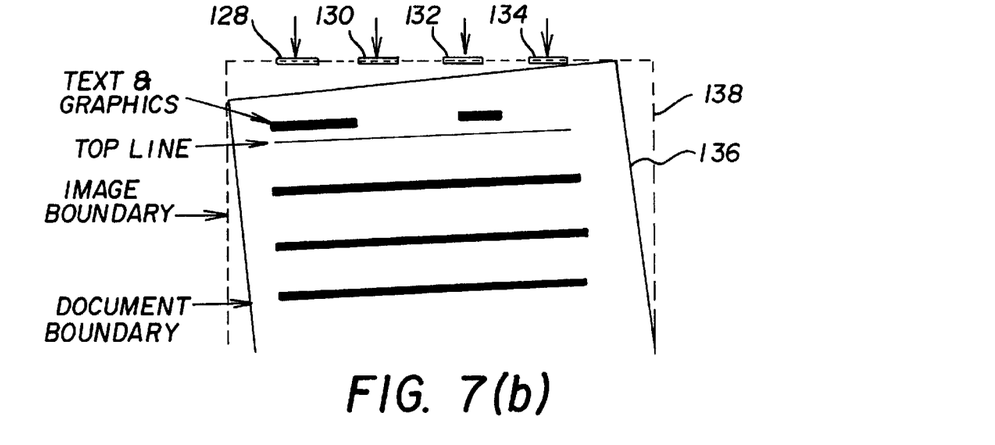
FIG. 7(b) is a perspective view of an initial position of four line-finding probes with respect to a document image in a frame of information.
Figure 7C:
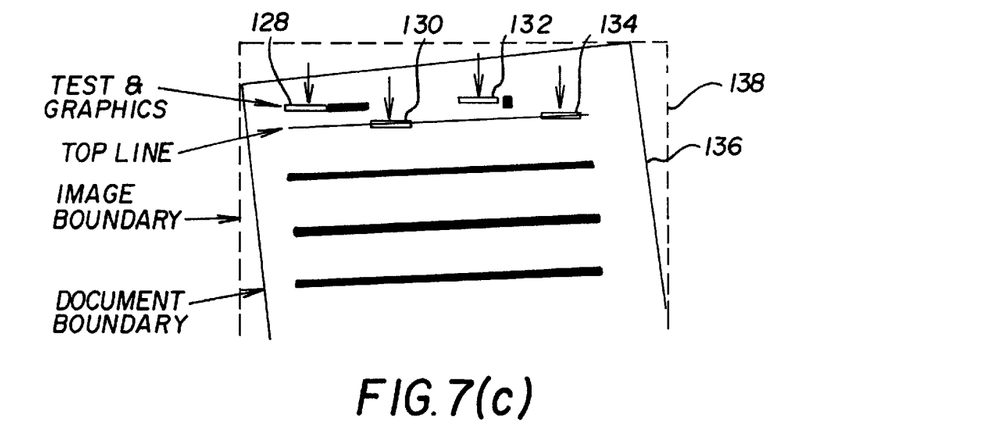
FIG. 7(c) is a perspective view of an intermediate positions of four line-finding probes with respect to the document image of FIG. 7(b)
Figure 7D:
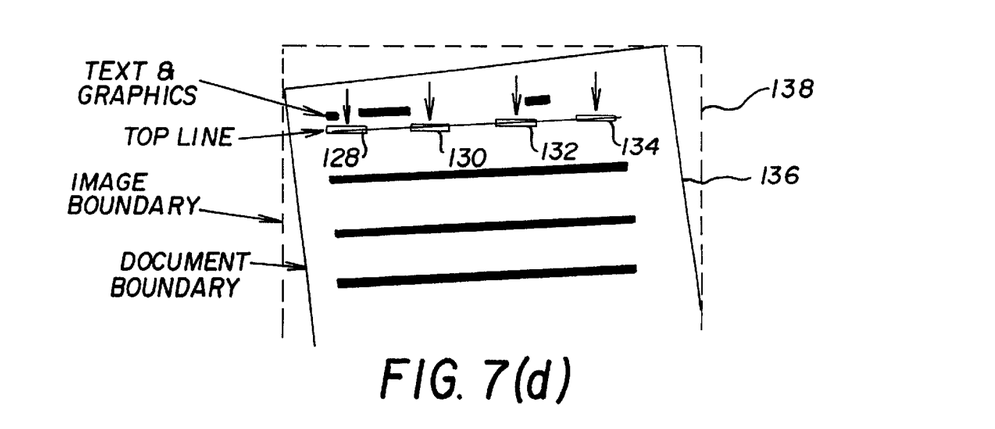
FIG. 7(d) is a perspective view of a final position of four line-finding probes with respect to the document image of FIG. 7(c)

Referring to FIG. 7(a), a flow chart illustrates the process for obtaining, comparing, and evaluating the attribute of line skew. Occasionally, the printed information on the document will not be rotationally aligned with the edge of the paper. Subsequent processes on the document images may not be carried out if the line skew is too severe.

The procedure for analyzing the attribute of line skew uses four probes 128, 130, 132, and 134 each of which has a rectangular window, to locate lines as shown in FIGS. 7(b–d). In this particular embodiment, each window is thirty-two pixels wide and two pixels high. This particular window was selected to balance the need to examine a sufficient number of pixels in the document and the need to keep the number low for efficiency considerations. First, the edges of the document image 136 in the frame of information 138 (Step 140) are located and a bounding box is generated around the document images (Step 142). Next, the probes 128, 130, 132, and 134 are initialized at equal distances along the top edge of document image 136, (Step 144) as shown in FIG. 7(b). Each probe 128, 130, 132, and 134 is moved downward one row at a time until each probe 128, 130, 132, and 134 covers enough black pixels to indicate the possibility of a line, (Step 146) as shown in FIG. 7(c). The colinearity of the probes 128, 130, 132, and. 134 is then checked (Step 148). If the probes appear to be sufficiently collinear, then their position marks the top line and the angle of the line with respect to a fixed frame of reference can be determined to obtain the attribute of line skew (Step 150). If collinearity is not established, then the probe 128, 130, 132, or 134 which has been moved forward the least is moved until the probe 128, 130, 132, or 134 detects another line (Step 152). Collinearity is then checked again (Step 148). If the probes are collinear, then the angle of the line formed by the probes is determined and is taken as the attributes of line skew, (Step 150) as shown in FIG. 7(d). If collinearity is not found, then the process continues (Step 152) until the line is found, or all probes 128, 130, 132, and 134 are moved past a preset point in the document. In this particular embodiment, the preset point is considered to be halfway down document image 136.

Once the attribute of line skew is obtained (Step 30), a threshold value for the attribute is selected from a database in RAM 31 or ROM 33 (Step 32). In this particular embodiment, the threshold value attribute of sharpness is 0 degrees. Once the threshold value is selected, the difference between the attribute of line skew and the threshold value is determined and then the difference is evaluated using predetermined criteria to provide evaluation results (Step 34). In this particular embodiment, the predetermined criteria will allow a line skew of up to ½ a degree. If the difference between the attribute of line skew and the threshold value is less than half a degree, then the evaluation results signal that the attribute of line skew is acceptable. If desired, system 20 can be programmed to correct the document image for any line skew.

Figure 8:
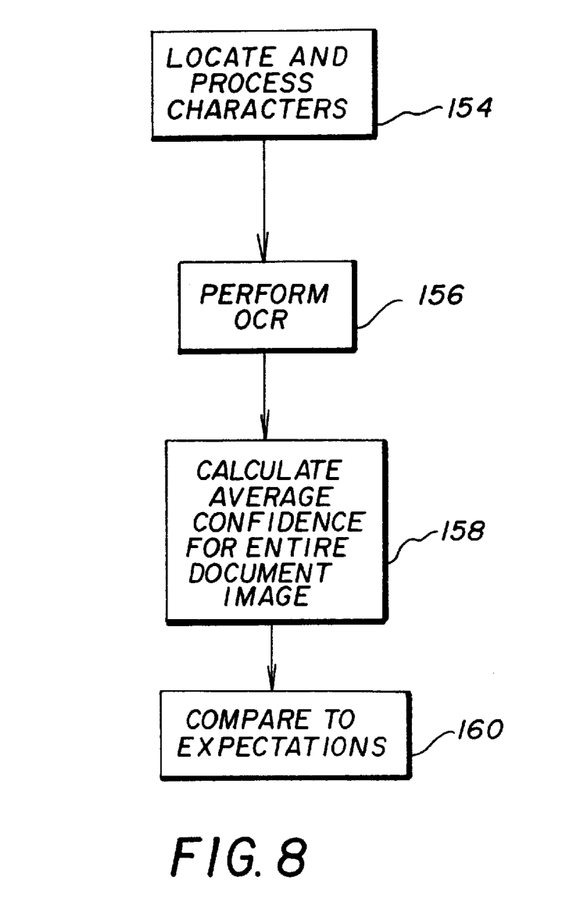
FIG. 8 is a flow chart illustrating the process for obtaining, comparing, the attribute of average character confidence.

Referring to FIG. 8, a flow chart illustrates the process for obtaining, comparing, and evaluating the attribute of average character confidence for the entire document image. First, characters within the document image are located and processed to separate the characters from each other (Step 154). Next, optical character recognition (OCR) is performed on each character to provide an average character confidence for each character (Step 156). In this step, system 20 and method identify each different type of character in document image and then run comparisons of each different character against stored characters. A percentage likelihood of each of the identified characters matching a stored character is determined and then the average of those percentages for each character is the average character confidence for each character. System 20 and method then averages together the average character confidence for all of the characters in the document image to provide the attribute of average character confidence for the entire document image (Step 158). The attribute of average character confidence provides an indication of the condition of overall character confidence in the document image and thus an indication of the quality of the document image itself.

Once the attribute of average character confidence is obtained (Step 30), a threshold value for the attribute is selected from a database in RAM 31 or ROM 33 (Step 32). In this particular embodiment, the threshold value for average character confidence is 100%. Once the threshold value is selected, the difference between the attribute of average character confidence and the threshold value is determined and the difference is evaluated using predetermined criteria to provide evaluation results (Step 34). In this particular embodiment, the predetermined criteria will accept a difference of up to 1.5 standard deviations away from the threshold value. If the difference is within 1.5 standard deviations, then the evaluation results signal that the attribute of average character confidence is acceptable.

Figure 9:
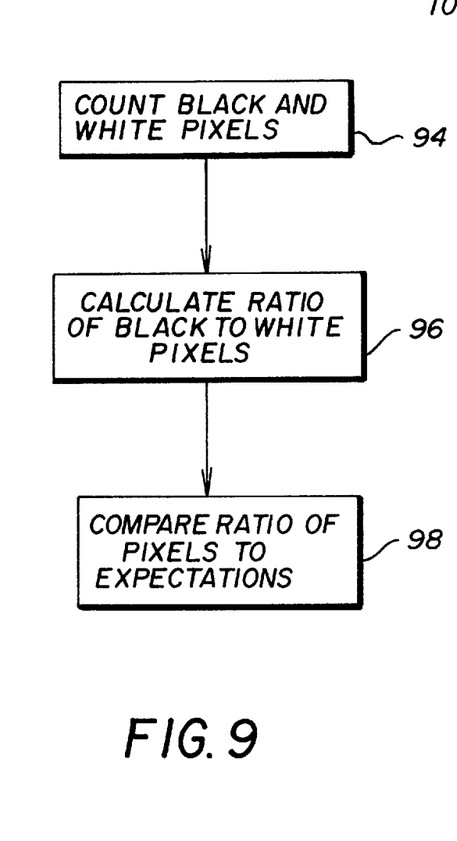
FIG. 9 is a flow chart illustrating the process for obtaining and comparing the attribute of expected contrast.

Referring to FIG. 9, a flow chart illustrates the process for obtaining, comparing, and evaluating the attribute of expected contrast. First, the number of black and white pixels in each row of the document image are counted (Step 94). Next, the ratio of black to white pixels for the entire document image is calculated to obtain the attribute of expected contrast (Step 96). Form documents, such as tax forms, will have the same ratio of black to white pixels in the document images each time the documents are scanned.

Once the attribute of expected contrast is obtained (Step 30), a threshold value for the attribute is selected from a database in RAM 31 or ROM 33 (Step 32). In this particular embodiment, the threshold value is a mean ratio of black to white pixels obtained from scanning a number of the same type of documents. Once the threshold value is selected, the difference between the attribute of expected contrast and the threshold value is determined and then the difference is evaluated using predetermined criteria to provide evaluation results (Step 34). In this particular embodiment, the predetermined criteria will accept a difference of up to one standard deviation above or below the threshold value. If the difference is within one standard deviation, then the evaluation results signal that the attribute of expected contrast is acceptable.

Figure 10:
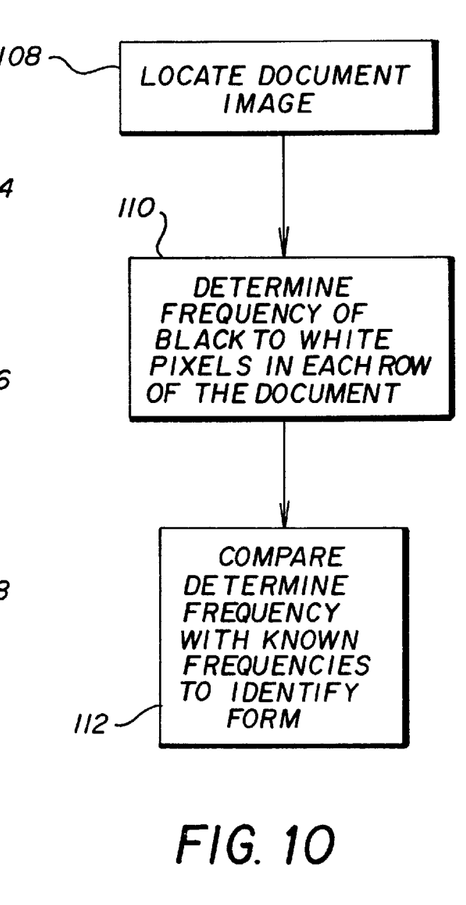
FIG. 10 is a flow chart illustrating the process for obtaining and comparing the attribute of sharpness.

Referring to FIG. 10, a flow chart illustrates the process for obtaining, comparing, and evaluating the attribute of sharpness. The attribute of sharpness provides an indication of how blurred the document image may be and whether the document image is suitable for further processing. First, the document image is located in the frame of information (Step 108). Once the document image is located, then the frequency of black to white pixels per line of the document image is obtained and is used as the attributes of sharpness (Step 110). Each type of form document, such as a tax form, will have a unique frequency of black to white pixels.

Once the attribute of sharpness is obtained (Step 30), a threshold value for the attribute is selected from a database in RAM 31 or ROM 33 (Step 32). In this particular embodiment, the threshold value is a mean frequency obtained from scanning a number of the same type of documents. Once the threshold value is selected, the difference between the attribute of sharpness is determined and the difference is evaluated using predetermined criteria to provide evaluation results (Step 34). In this particular embodiment, the predetermined criteria will accept a difference of up to 10% from the threshold value. If the difference is within 10%, then the evaluation results signal that the attribute of sharpness is acceptable.

Having thus described the basic concept of the invention, it will be readily apparent those skilled in the art that the foregoing detailed disclosure is intended to be presented by way of example only, and is not limiting. Various alterations, improvements, and modifications will occur and are intended to those skilled in the art, though not expressly stated herein. These modifications, alterations and improvements are intended to be suggested hereby, and are within the spirit and scope of the invention. Accordingly, the invention is limited only by the following claims and equivalents thereto.

PARTS LIST 20 document image assessment system
22 scanner assembly
24 storage device
26 operator control device
28 image assessment unit
30 attribute processing device
32 database of attribute thresholds
34 attribute evaluation device
36 keyboard
38 display
40 step
42 step
44 frame of information
46 document image
48 edge
50 frame of information
52 document image
54 tear
56 edge
58 step
60 step
62 step
64 step
66 step
68 step
70 step
72 step
74 document image
76 frame of information
78 document image
80 frame of information
82 step
84 step
86 upper left hand corner
88 step
90 step
92 step
94 step
96 step
98 step
100 step
102 step
104 step
106 step
108 step
110 step
112 step
114 step
116 step
118 step
120 step
122 step
124 step
126 step
128 probe
130 probe
132 probe
134 probe
136 document image
138 frame of information
140 step
142 step
144 step
146 step
148 step
150 step
152 step
154 step
156 step
158 step
160 step

What is claimed is:

1. A method for assessing the condition of a document as represented by a document image produced by a high speed document scanner to determine whether the document image is suitable for further processing, the method comprising the steps of:

establishing and adjusting criteria for assessing the document image;

selecting a plurality of document image attributes related to the geometrical integrity of the document image, the condition of the document image, and the condition of the text in the document image, that support the selected criteria;

selecting a plurality of threshold values corresponding to the selected attributes;

processing the document image to obtain values for the selected attributes; and comparing the value of each of the obtained values for the selected attributes against the threshold value selected for the obtained attribute to determine a difference for each and then evaluating the differences using the predetermined criteria to provide evaluation results of the document image.

2. The method as set forth in claim 1 further comprising the step of scanning a document to obtain the document image with a scanner assembly.

3. The method as set forth in claim 2 further comprising the step of storing the attributes, the predetermined threshold values, and the evaluation results in a storage device.

4. The method as set forth in claim 1 further comprising the steps of:

locating at least one edge of the document image;
placing three or more sample points along the edge;
locating the three or more sample points;
establishing a line between each set of two or more of the sample points, each of the lines having an angle with respect to a fixed reference;
determining the angle for each of the lines; and
determining the difference between each of set of two of angles to obtain values of attributes of tears in the document, folded corners in the document, and multiple overlapping documents in the document image.

5. The method as set forth in claim 1 further comprising the steps of:

locating each corner of the document image;
assigning a label to each corner;
establishing a line between each set of two adjacent labels, each of the lines having an angle with respect to a fixed reference;
determining the angle for each line; and
determining the difference between each set of two of angles to obtain a value for attributes of tears in the document, folded corners in the document, multiple overlapping documents in the document image.

6. The method as set forth in claim 1 further comprising the steps of:

detecting edges of the document image;
generating a bounding box around the document image;
determining coordinates of expected corners for the document image with respect to a fixed reference;

detecting coordinates of actual corners for the document image with respect to the fixed reference; and determining the difference between the location of the expected corners and the actual corners to obtain a value for an attribute of tears in the document, folded corners in the document, multiple overlapping documents in the document image.

7. The method as set forth in claim 1 further comprising the steps of:

detecting the location of the document image;

selecting one or more portions of the document image;

comparing each of the portions of the document image for a particular type of expected field; and determining the number of expected fields which were identified to obtain a value for the attribute of average character confidence.

8. The method as set forth in claim 1 wherein the step of processing the document image to obtain a value for the attribute of average character confidence comprises the steps of:

detecting the location of the document image;

locating and processing each character in the document image;

performing optical character recognition on each located character and obtaining an average character confidence for each character; and averaging all of the average character confidences for each character obtained to obtain the value for the attribute of average character confidence for the document image.

9. The method as set forth in claim 1 wherein the step of processing the document image to obtain a value for the attribute of expected contrast comprises the steps of:

detecting the location of the document image; and counting the number of black and white pixels in the document image to obtain the value for the attribute of expected contrast.

10. The method as set forth in claim 1 wherein the step of processing the document image to obtain the attribute of sharpness comprises the steps of:

detecting the location of the document image; and determining the frequency of black to white pixels per line of the document image to obtain the value of the attributes of sharpness.

11. A system for assessing the condition of a document as represented by a document image produced by a high speed document scanner to determine whether the document image is suitable for further processing, the system comprising:

means for establishing and adjusting a criteria for assessing the document image;

means for selecting and storing in the data base a plurality of document image attributes related to the geometrical integrity of the document image, the condition of the document image, and the condition of the text in the document image, that support the selected criteria;

means for adjusting and storing in the data base a plurality of threshold values corresponding to the selected attributes;

means for processing the document image to obtain values for the selected attributes; and means for comparing each of the obtained attributes against the threshold value selected for the obtained attribute to determine the difference for each and the evaluating the differences using the selected criteria to provide evaluation results of the document image.

12. The system as set forth in claim 11 further comprising a scanner assembly for scanning documents to obtain the document images, the scanner assembly providing the document images to the means for processing.

13. The system as set forth in claim 11, further comprising a storage device coupled to means for processing and the means for comparing, the storage device storing the attributes, the threshold values, and the evaluation results.

* * * * *